(12) United States Patent
Zeng et al.

(10) Patent No.: US 12,287,445 B1
(45) Date of Patent: Apr. 29, 2025

(54) COAL ROCK INTERFACE DIRECTIONAL DETECTION DEVICE AND METHOD BASED ON ELASTIC WAVES

(71) Applicant: CHINA UNIVERSITY OF MINING AND TECHNOLOGY, BEIJING, Beijing (CN)

(72) Inventors: Yifan Zeng, Beijing (CN); Xianhui Wang, Beijing (CN); Qiang Wu, Beijing (CN); Chunsheng Liu, Beijing (CN); Fei Chen, Beijing (CN); Jia Zhao, Beijing (CN); Zhuangjie Cui, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 18/939,876

(22) Filed: Nov. 7, 2024

(30) Foreign Application Priority Data

Feb. 7, 2024 (CN) .......................... 202410174981.5

(51) Int. Cl.
*G01V 1/46* (2006.01)
*G01V 1/50* (2006.01)
(52) U.S. Cl.
CPC .................. *G01V 1/46* (2013.01); *G01V 1/50* (2013.01); *G01V 2210/641* (2013.01)
(58) Field of Classification Search
CPC ....... G01V 1/46; G01V 1/50; G01V 2210/641
See application file for complete search history.

(56) References Cited

U.S. PATENT DOCUMENTS

| 8,547,788 B2 * | 10/2013 | Wang | ........................ | G01V 1/50 703/2 |
| 2011/0280101 A1 * | 11/2011 | Wang | ........................ | G01V 1/46 367/25 |

(Continued)

FOREIGN PATENT DOCUMENTS

| CN | 103174413 A | 6/2013 |
| CN | 105649607 A | 6/2016 |

(Continued)

OTHER PUBLICATIONS

First Office Action issued in counterpart Chinese Patent Application No. 202410174981.5, dated Aug. 15, 2024.

(Continued)

*Primary Examiner* — Krystine E Breier
(74) *Attorney, Agent, or Firm* — Westbridge IP LLC

(57) ABSTRACT

A coal rock interface directional detection device based on elastic waves includes: a probe body including an elastic wave receiving device and an elastic wave excitation device spaced set at the top; a protective tube with one end connected to the adapter. The protective tube includes a collection circuit board inside the protective tube, and the collection circuit board is electrically connected to the elastic wave receiving device and the elastic wave excitation device; a sleeve, installed outside the protective tube, with one end connected to the side of the probe body near the adapter and with the other end connected to the side of the protective tube away from the adapter; and a control host, wirelessly connected with the acquisition circuit board. A coal rock interface directional detection method based on elastic waves applied in the coal rock interface directional detection device is also disclosed.

5 Claims, 3 Drawing Sheets

(56) References Cited

U.S. PATENT DOCUMENTS

| | | | |
|---|---|---|---|
| 2012/0230151 A1* | 9/2012 | Almaguer | E21B 7/061 |
| | | | 166/241.1 |
| 2021/0324737 A1 | 10/2021 | Xu et al. | |
| 2023/0333273 A1* | 10/2023 | Ma | G01V 1/368 |

FOREIGN PATENT DOCUMENTS

| | | |
|---|---|---|
| CN | 113266338 A | 8/2021 |
| CN | 115822578 A | 3/2023 |
| JP | 2002296253 A | 10/2002 |

OTHER PUBLICATIONS

Notification to Grant Patent Right for Invention issued in counterpart Chinese Patent Application No. 202410174981.5, dated Sep. 29, 2024.

\* cited by examiner

COAL ROCK INTERFACE DIRECTIONAL DETECTION DEVICE AND METHOD BASED ON ELASTIC WAVES

CROSS-REFERENCE TO RELATED APPLICATIONS

This application claims priority to Chinese Patent Application No. 202410174981.5, filed on Feb. 7, 2024, the content of which is incorporated herein by reference in its entirety.

TECHNICAL FIELD

The present disclosure relates to the field of coal rock detection technology, particularly to a coal rock interface directional detection device based on elastic waves and a coal rock interface directional detection method based on elastic waves.

BACKGROUND

Coal is an important kind of natural resources. With a rapid development on detection sensors, the instant data messaging technology and the computer processing technology, researches on coal rock identifications are gradually showing a trend towards digitalization, intelligence, a high efficiency and a high precision. At present, commonly used technologies of coal rock identifications may include gamma ray methods, infrared recognition methods, image recognition methods, geological radar detection methods, vibration signal recognition methods, and etc.

The gamma ray methods may be used to estimate thicknesses of coal seams based on changes in a quality coefficient of gamma rays that penetrate the coal seams. However, a disadvantage of natural gamma rays is that they are greatly limited by geological environments and their effects are not significant. However, artificial gamma rays may harm the health of human beings.

The infrared recognition methods are non-contact detection methods that use infrared thermal imaging to determine coal and rock layers based on different infrared radiations emitted by the coal and rock layers due to material differences. One of the disadvantages of these methods is that it may be easily affected by factors such as mining environments and temperatures, and the recognition accuracy may be low.

The image recognition methods are based on the differences in textures and other features between coal images and rock images to determine coal rock layers. One of the disadvantages of these methods is that the image quality may be greatly affected by environmental factors, such as dust and light, which may affect the recognition results.

The geological radar detection methods may be used to calculate thicknesses of coal seams by receiving reflected waves generated by electromagnetic wave pulses at the coal rock interface, and then identifying the coal rock interfaces. One of the disadvantages of these methods is that electromagnetic waves may attenuate significantly in the coal seams and may not be suitable for thick coal seams.

The vibration signal recognition methods may utilize differences in vibration signals generated when cutting coal or rocks of different hardness to determine coal and rock layers. One of the disadvantages of these methods is that when the hardness of coal and rock is close, the recognition accuracy is low, and the vibration signal acquisition is susceptible to interference from mechanical equipment.

The multi-sensor information fusion recognition methods may use multiple sensors to collect data, conduct comprehensive analysis and judgment to identify coal and rock layers. Compared with the single sensor recognition technology, these methods may obtain a higher recognition accuracy. One of the disadvantages of these methods is that the hardware requirements of the entire recognition system are high and the recognition cycle is long. If there are conflicts in the recognition results of multiple signals during the recognition decision-making process, the stability of the recognition system will be destroyed.

Therefore, there is an urgent need for a coal rock interface directional detection device and related methods to avoid or reduce interferences from factors such as working face environment on identification, without harming the health of testers, and with a good application scope, a high recognition accuracy, and a fast recognition speed.

SUMMARY

In view of the above, examples of the present disclosure provide a coal rock interface directional detection device based on elastic waves and a coal rock interface directional detection method based on elastic waves to solve the above-mentioned technical problems.

In examples of the present disclosure, the coal rock interface directional detection device based on elastic waves may include: a probe body, the probe body comprises an elastic wave receiving device and an elastic wave excitation device spaced set at the top of the probe body, one side of the probe body is provided with an adapter, and a cross-sectional size of the adapter is smaller than a cross-sectional size of the probe body; a protective tube with one end connected to the adapter, the protective tube comprises a collection circuit board inside the protective tube, and the collection circuit board is electrically connected to the elastic wave receiving device and the elastic wave excitation device; a sleeve, installed outside the protective tube, with one end connected to the side of the probe body near the adapter and with the other end connected to the side of the protective tube away from the adapter; and a control host, wirelessly connected with the collection circuit board.

In examples of the present disclosure, the protective tube may include a first tube and a second tube which are connected; a diameter of the first tube is smaller than a diameter of the second tube; one end of the first tube has a threaded connection with the adapter; one end of the second tube has a threaded connection with the sleeve; and the collection circuit board is arranged inside the second tube.

In examples of the present disclosure, the first tube is equipped with a sliding nut, which is used to provide a threaded connection at the end of the first tube to cover the adapter.

In examples of the present disclosure, the probe body has a threaded connection with a protective cover at one end away from the adapter.

In examples of the present disclosure, the collection circuit board may be equipped with a processing module, an elastic wave excitation circuit, an elastic wave reception circuit, a wireless communication module, a power supply module, and a storage module; the elastic wave excitation circuit, the elastic wave reception circuit, the wireless communication module, the power supply module, and the storage module are electrically connected to the processing module; the elastic wave excitation circuit is electrically connected to the elastic wave excitation device, the elastic wave reception circuit is electrically connected to the elastic wave reception device, and the wireless communication module is in communication with the control host.

In examples of the present disclosure, the elastic wave excitation device is located near the adapter.

In examples of the present disclosure, the coal rock interface directional detection method based on elastic waves applied in the coal rock interface directional detection device based on elastic waves as described above may include the following steps: drilling a horizontal hole in a coal seam of a mining face to obtain a horizontal hole, where an extension direction of the horizontal hole is perpendicular to a mining direction of the mining face; installing the coal rock interface directional detection device at a back of a drill bit; advancing the drill bit to a target position in the horizontal hole; positioning the elastic wave receiving device and the elastic wave excitation device vertically upwards; controlling the elastic wave excitation device to excite first elastic waves into the coal seam through the control host; receiving the first elastic waves through the elastic wave receiving device; recording a first time interval; rotating the drill bit to position the elastic wave receiving device and the elastic wave excitation device vertically downwards; controlling the elastic wave excitation device to excite second elastic waves to the coal seam through the control host; receiving the second elastic waves through the elastic wave receiving device; recording a second time interval; calculating a thickness of the coal seam at the target location based on the first time interval and the second time interval.

In examples of the present disclosure, formulas for calculating the thickness h of the coal seam at the target location may include:

$$h = h_1 + h_2; t_1 = \frac{\sqrt{4h_1^2 + x^2}}{v}; t_2 = \frac{\sqrt{4h_2^2 + x^2}}{v};$$

where, $h_1$ represents a thickness from the horizontal hole to a top coal rock interface of the coal seam at the target position; $h_2$ represents a thickness from the horizontal hole to a bottom coal rock interface of the coal seam at the target position; $t_1$ represents the first time interval; $t_2$ represents the second time interval; x represents a horizontal distance between the elastic wave receiving device and the elastic wave excitation device; and v represents a propagation speed of the elastic wave in the coal seam.

In examples of the present disclosure, the coal rock interface directional detection method based on elastic waves may further include: advancing the drill bit in the horizontal hole gradually to obtain the thickness of the coal seam at multiple target positions, and obtaining a thickness distribution state of the coal seam along the extension direction of the horizontal hole.

In examples of the present disclosure, the number of horizontal holes may be multiple, and adjacent horizontal holes may be spaced apart.

From the above, it can be seen that the present application provides a coal rock interface directional detection device based on elastic waves and a coal rock interface directional detection method based on elastic waves. The coal rock interface directional detection device based on elastic waves may include: a probe body installed with an elastic wave receiving device and an elastic wave excitation device set spaced at the top for transmitting and receiving elastic waves to calculate a thickness of the coal seam. One side of the probe body is equipped with an adapter. The cross-sectional size of the adapter is smaller than that of the probe body, which facilitates a wrapping of the adapter inside a sleeve which provides a protection when connecting the sleeve to the probe body. Further, a protection tube is connected to an adapter at one end, and a collection circuit board is installed inside the protection tube. The collection circuit board is electrically connected to the elastic wave receiving device and the elastic wave excitation device for signal processing. The sleeve which provides a protection for the protection tube is installed outside the protection tube, with one end connected to a side of the probe body near the adapter and the other end connected to a side of the protection tube away from the adapter. A control host for controlling transmissions and receptions of elastic waves is wirelessly connected to the collection circuit board. The coal rock interface directional detection device based on elastic waves and the coal rock interface directional detection method based on elastic waves has a simple structure, a good stability, a high accuracy and are easy to operate. It can detect the coal rock interface effectively, determine the thickness of the coal seam accurately, and provide reliable analysis and prediction data for geological explorers.

BRIEF DESCRIPTION OF THE DRAWINGS

In order to describe technical solutions of the present application or related arts more clearly, accompanying drawings required for describing examples or the related art are introduced briefly in the following. Apparently, the accompanying drawings in the following descriptions only illustrate some examples of the present application, and those of ordinary skill in the art may still derive other drawings from these drawings without creative efforts.

DETAILED DESCRIPTION OF THE EMBODIMENTS

Figure 1:
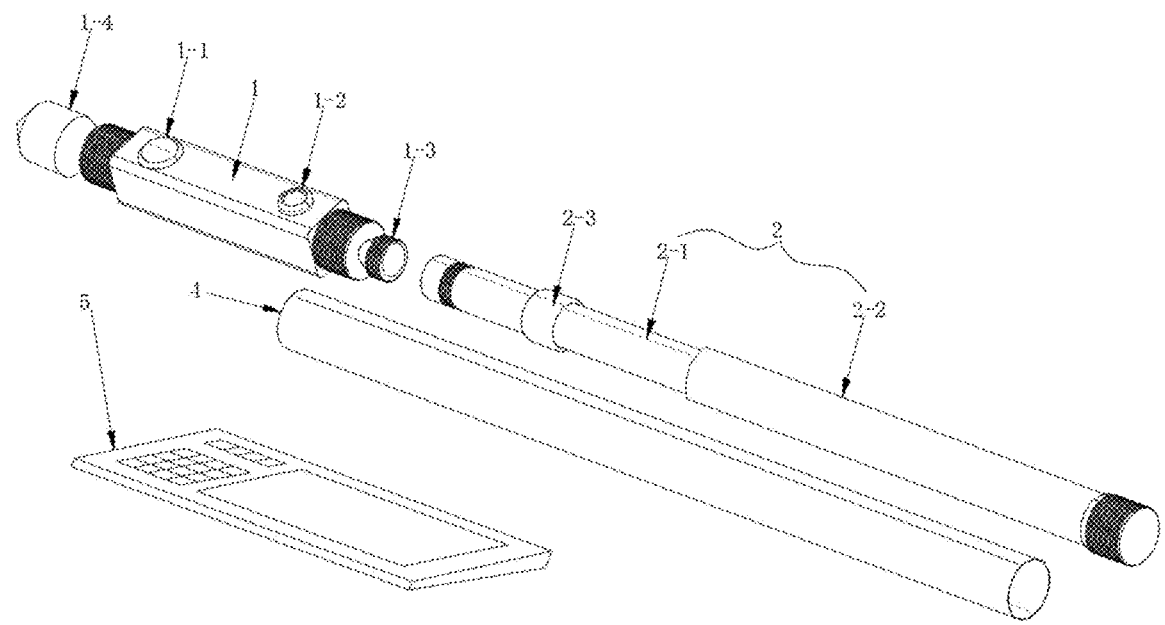
FIG. 1 is a schematic diagram of an explosion structure of a coal rock interface directional detection device based on elastic waves according to an example of the present disclosure.

Hereinafter, in order to make the objective(s), technical solution(s) and advantages of the present application clearer and more understandable, the present application will be further described in detail, in connection with specific embodiments and with reference to the accompanying drawings.

It is necessary to be noted that the technical terms or scientific terms used in the embodiments of the present application should have common meanings as understood by those skilled in the art of the present application, unless otherwise defined. The "first", "second" and similar words used in the embodiments of the present application do not refer to any sequence, number or importance, but are only used to distinguish different component portions. The "comprise", "include" or a similar word means that an element or item before such word covers an element or item or any equivalent thereof as listed after such word, without excluding other elements or items. The "connect" or "interconnect" or a similar word does not mean being limited to a physical or mechanical connection, but may include a direct or indirect electrical connection. The "upper", "lower", "left" and "right" are used only to indicate a relative position relation, and after the absolute position of the described object is changed, the relative position relation may be changed accordingly.

Coal is an important kind of natural resources. With a rapid development on detection sensors, the instant data messaging technology and the computer processing technology, researches on coal rock identifications are gradually showing a trend towards digitalization, intelligence, a high efficiency and a high precision. At present, commonly used technologies of coal rock identifications may include gamma ray methods, infrared recognition methods, image recognition methods, geological radar detection methods, vibration signal recognition methods, and etc.

The gamma ray methods may be used to estimate thicknesses of coal seams based on changes in a quality coefficient of gamma rays that penetrate the coal seams. However, a disadvantage of natural gamma rays is that they are greatly limited by geological environments and their effects are not significant. However, artificial gamma rays may harm the health of human beings.

The infrared recognition methods are non-contact detection methods that use infrared thermal imaging to determine coal and rock layers based on different infrared radiations emitted by the coal and rock layers due to material differences. One of the disadvantages of these methods is that it may be easily affected by factors such as mining environments and temperatures, and the recognition accuracy may be low.

The image recognition methods are based on the differences in textures and other features between coal images and rock images to determine coal rock layers. One of the disadvantages of these methods is that the image quality may be greatly affected by environmental factors, such as dust and light, which may affect the recognition results.

The geological radar detection methods may be used to calculate thicknesses of coal seams by receiving reflected waves generated by electromagnetic wave pulses at the coal rock interface, and then identifying the coal rock interfaces. One of the disadvantages of these methods is that electromagnetic waves may attenuate significantly in the coal seams and may not be suitable for thick coal seams.

The vibration signal recognition methods may utilize differences in vibration signals generated when cutting coal or rocks of different hardness to determine coal and rock layers. One of the disadvantages of these methods is that when the hardness of coal and rock is close, the recognition accuracy is low, and the vibration signal acquisition is susceptible to interference from mechanical equipment.

The multi-sensor information fusion recognition methods may use multiple sensors to collect data, conduct comprehensive analysis and judgment to identify coal and rock layers. Compared with the single sensor recognition technology, these methods may obtain a higher recognition accuracy. One of the disadvantages of these methods is that the hardware requirements of the entire recognition system are high and the recognition cycle is long. If there are conflicts in the recognition results of multiple signals during the recognition decision-making process, the stability of the recognition system will be destroyed.

Therefore, there is an urgent need for a coal rock interface directional detection device and a coal rock interface directional detection method to avoid or reduce interferences from factors such as working face environments on identification, without harming the health of testers, and with a good application scope, a high recognition accuracy, and a fast recognition speed. During explorations of the present disclosure, it was found that the use of elastic waves can be considered for a directional detection of coal seams, an identification of coal rock interfaces and a determination of thickness of the coal seams.

Technical solutions of the present disclosure will be explained in detail through specific examples and in combination with FIG. 1 to FIG. 5.

Figure 2:
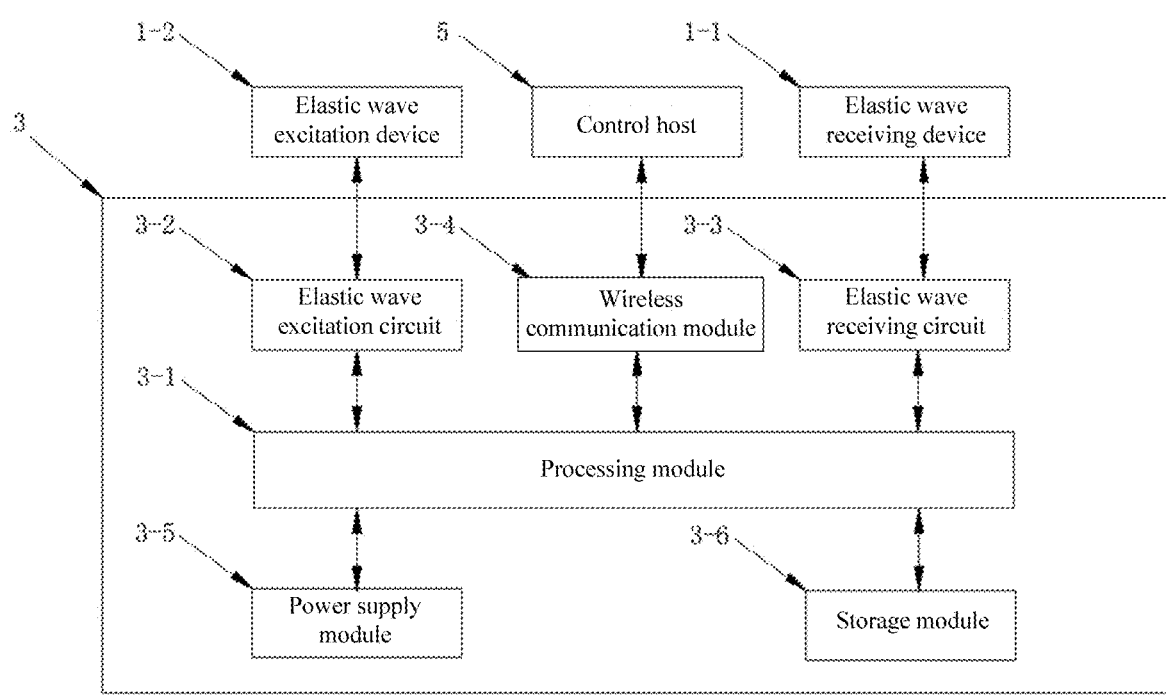
FIG. 2 is a schematic diagram of a structure of the collection circuit board according to an example of the present disclosure.

In examples of the present disclosure, as shown in FIG. 1 and FIG. 2, the coal rock interface directional detection device based on elastic waves may include a probe body 1, a protective tube 2, a sleeve 4 and a control host 5. In the device, the probe body 1 may include an elastic wave receiving device 1-1 and an elastic wave excitation device 1-2 spaced set at the top. One side of the probe body 1 may be provided with an adapter 1-3. Moreover, a cross-sectional size of the adapter 1-3 may be smaller than a cross-sectional size of the probe body 1. The protective tube 2 may be with one end connected to the adapter 1-3. Further, the protective tube 2 may include a collection circuit board 3 inside. The collection circuit board 3 may be electrically connected to the elastic wave receiving device 1-1 and the elastic wave excitation device 1-2. The sleeve 4 may be installed outside the protective tube 2, with one end connected to the side of the probe body 1 near the adapter 1-3 and with the other end connected to the side of the protective tube 2 away from the adapter 1-3. The control host 5 may be wirelessly connected with the acquisition circuit board 3.

As shown in FIG. 1, the probe body 1 may have a cylindrical structure as a whole, with the elastic wave receiving devices 1-1 and the elastic wave excitation devices 1-2 set spaced at the top for receiving and emitting elastic waves respectively to calculate the thickness of the coal seam 6. Elastic waves are a type of stress waves, which refer to transmissions of stress and strain caused by disturbances or external forces in an elastic medium. When elastic waves propagate in a VTI (transverse isotropy with a vertical axis of symmetry) media, they may encounter differences in wave impedance at the interface, voids, and cracks where a continuity of the medium changes, resulting in phenomena such as reflection, refraction, and scattering of elastic waves. These phenomena may change the propagation speed, the amplitude, and phase characteristics of the elastic waves, forming complex signals. Elastic waves may reflect at the coal rock interfaces. Based on this, a coal rock interface can be identified and the thickness of coal seam 6 can be determined.

One side of the probe body 1 may be equipped with an adapter 1-3, which is, for example, a threaded reducer. The cross-sectional size of the adapter 1-3 may be smaller than the cross-sectional size of the probe body 1, making it convenient to wrap the adapter 1-3 inside the sleeve 4 for protection when connecting the sleeve 4 to the probe body 1.

The protective tube 2 may be made of stainless steel. The protective tube 2 may be connected to the adapter 1-3 at one end. The collection circuit board 3 is inside the protective tube 2. The collection circuit board 3 is electrically connected to the elastic wave receiving device 1-1 and the elastic wave excitation device 1-2 for signal processing.

The sleeve 4 may be made of stainless steel for example. The sleeve 4 may be placed outside the protective tube 2 to provide protection for the device. One end of the sleeve 4 may be connected to the side of the probe body 1 near the adapter 1-3, and the other end may be connected to the side of the protective tube 2 away from the adapter 1-3 to provide protections. By setting the sleeve 4 and the protective tube 2, a double protection may be provided, especially in harsh mining conditions, which can prevent damages to the integrated circuit board and ensure detection effectiveness.

The control host 5, such as a tablet computer, may be wirelessly connected to the collection circuit board 3, such as through Bluetooth, to control the transmission and reception of the elastic waves. During the detection process, the control host 5 may be independently set outside the coal seam 6 for an easy manual control, while the probe body 1, the protective tube 2, and the sleeve 4 may enter the coal seam 6 with the drill bit for detection.

It can be seen that the coal rock interface directional detection device based on elastic waves has a simple structure, a good stability, a high accuracy and may be easy to operate. Moreover, the device can detect the coal rock interface and determine the thickness of the coal seam 6 effectively.

The coal rock interface directional detection device based on the elastic waves can achieve interface detection research under various working conditions through an on-site testing in different geological scenarios underground. It can obtain various corresponding features of interface detection under different working conditions, providing basic information for subsequent feature extractions and judgments. It can identify the thickness of the coal seam 6 and the position of the coal rock interface in a borehole accurately, with a large amount of detection data. At the same time, it can avoid strong artificial interference background in the borehole to improve the recognition and processing ability of weak signals. This can ensure accurate and reliable detection results and provide a more scientific basis for guiding coal rock identification.

The coal rock interface directional detection device based on elastic waves can perform detections in horizontal boreholes in the coal seam 6 of the mining face to detect the thickness of the coal seam 6 within a range of 0-15 meters around the borehole, and identify the position of the coal rock interface accurately. It can achieve a real-time display of detection results when the on-site control host 5 performs detections. It can also analyze the detection results into graphs and make predictions, without the need for complex manual data analysis and processing stages. In this way, a reliable analysis and forecasting data may be provided for the geological explorers.

In some examples, as shown in FIG. 1, the elastic wave excitation device 1-2 may be located near the adapter 1-3.

By setting the elastic wave excitation device 1-2 close to the adapter 1-3, when the coal rock interface directional detection device based on elastic waves extends into the horizontal hole 7 of the coal seam 6, the elastic wave receiving device 1-1 can enter the horizontal hole 7 first, and the elastic wave excitation device 1-2 can enter the horizontal hole 7 later, ensuring that the elastic waves excited by the elastic wave excitation device 1-2 can be received by the elastic wave receiving device 1-1 and ensuring the detection effect.

In examples of the present disclosure, as shown in FIG. 1, the protective tube 2 may include a first tube 2-1 and a second tube 2-2. The first tube 2-1 and the second tube 2-2 are connected. The diameter of the first tube 2-1 is smaller than the diameter of the second tube 2-2. One end of the first tube 2-1 may have a threaded connection with the adapter 1-3. One end of the second tube 2-2 may have a threaded connection with the sleeve 4. Moreover, the collection circuit board 3 may be arranged inside the second tube 2-2.

As shown in FIG. 1, the protective tube 2 including the first tube 2-1 and the second tube 2-2 which are connected may provide space for circuit connections between the collection circuit board 3 and the elastic wave receiving device 1-1 and the elastic wave excitation device 1-2. One end of the first tube 2-1 may have a threaded connection with the adapter 1-3. For example, the adapter 1-3 may be provided with a male thread, and the end of the first tube 2-1 may be provided with a female thread to cooperate with the male thread for connections. Moreover, one end of the second tube 2-2 may have a threaded connection with the sleeve 4. For example, both ends of the sleeve 4 may be provided with female threads, the end of the second tube 2-2 may be provided with a male thread, and the end of the probe body 1 near the adapter 1-3 may be also provided with a male thread to cooperate with the female threads for connections. In addition, the diameter of the first tube 2-1 may be smaller than the diameter of the second tube 2-2, ensuring that the sleeve 4 can be fitted and connected to the protective tube 2. In this way, the stability may be improved.

In examples of the present disclosure, as shown in FIG. 1, the first tube 2-1 may be equipped with a sliding nut 2-3, which may be used for a threaded connection at the end of the first tube 2-1 to cover the adapter 1-3.

As shown in FIG. 1, the first tube 2-1 may be fitted with the sliding nut 2-3, and a male thread may be provided near the end of the first tube 2-1, which can be connected to the sliding nut 2-3. The sliding nut 2-3 may be set up to be connected to the end of the first tube 2-1 after the first tube 2-1 is connected to the adapter 1-3, so as to cover the adapter 1-3 to provide protections. The parts of the first tube 2-1 and the adapter 1-3 are relatively vulnerable. In actual mining environments, there may be crushed stones or other situations that may damage these parts and cause bending, which may affect the detection results seriously. Through the double protection of the sleeve 4 and the sliding nut 2-3, the detection effect may be further ensured.

In examples of the present disclosure, as shown in FIG. 1, the probe body 1 may have a threaded connection with a protective cover 1-4 at one end away from the adapter 1-3.

As shown in FIG. 1, one end of the probe body 1 away from the adapter 1-3 may be provided with a male thread, and the male thread may be connected to the protective cover 1-4. The protective cover 1-4 can be removed during a detection process to connect the probe body 1 with the drill bit or a drill rod. After the detection process is completed, the protective cover 1-4 can be installed on the probe body 1 to provide a protection for the probe body 1.

In some examples of the present disclosure, as shown in FIG. 2, the collection circuit board 3 may be provided with a processing module 3-1 and an elastic wave excitation circuit 3-2, an elastic wave receiving circuit 3-3, a wireless communication module 3-4, a power supply module 3-5, and a storage module 3-6. The elastic wave excitation circuit 3-2, the elastic wave receiving circuit 3-3, the wireless communication module 3-4, the power supply module 3-5, and the storage module 3-6 may be electrically connected to the processing module 3-1. The elastic wave excitation circuit 3-2 may be electrically connected to the elastic wave excitation device 1-2. The elastic wave receiving circuit 3-3 may be electrically connected to the elastic wave receiving device 1-1. Moreover, the wireless communication module 3-4 may be in communication with the control host 5.

In some examples of the present disclosure, the processing module 3-1 may be, for example, an ARM microcomputer module that can control signal transmissions, signal receptions, signal processing and data calculations. The elastic wave excitation circuit 3-2 may be electrically connected to the elastic wave excitation device 1-2, which can control the excitation of elastic waves and perform signal conversions. The elastic wave receiving circuit 3-3 may be electrically connected to the elastic wave receiving device 1-1, which can control the reception of elastic waves and perform signal conversions. The wireless communication module 3-4, such as a Bluetooth module, may be connected to the control host 5 for communications. The power supply module 3-5 may be used to provide power. Moreover, the storage module 3-6 may be used to store processed information.

Descriptions of the present disclosure is provided for the purpose of illustration and description, and is not exhaustive or limited to the disclosed form. Modifications and changes may be obvious to those skilled in the art. The selection and description of examples are intended to better illustrate the principles and practical applications of the present disclosure, and to enable those skilled in the art to understand the present disclosure and design various examples with various modifications suitable for specific purposes.

Those skilled in the art should understand that the discussion of any of the above examples is only exemplary and is not intended to imply that the scope of the present disclosure (including the claims) is limited to these examples. Under the concept of this disclosure, the technical features in the above examples or different examples can also be combined, and there are many other variations in different aspects of the examples of this disclosure as described above, which are not provided in detail for the sake of simplicity.

Figure 5:
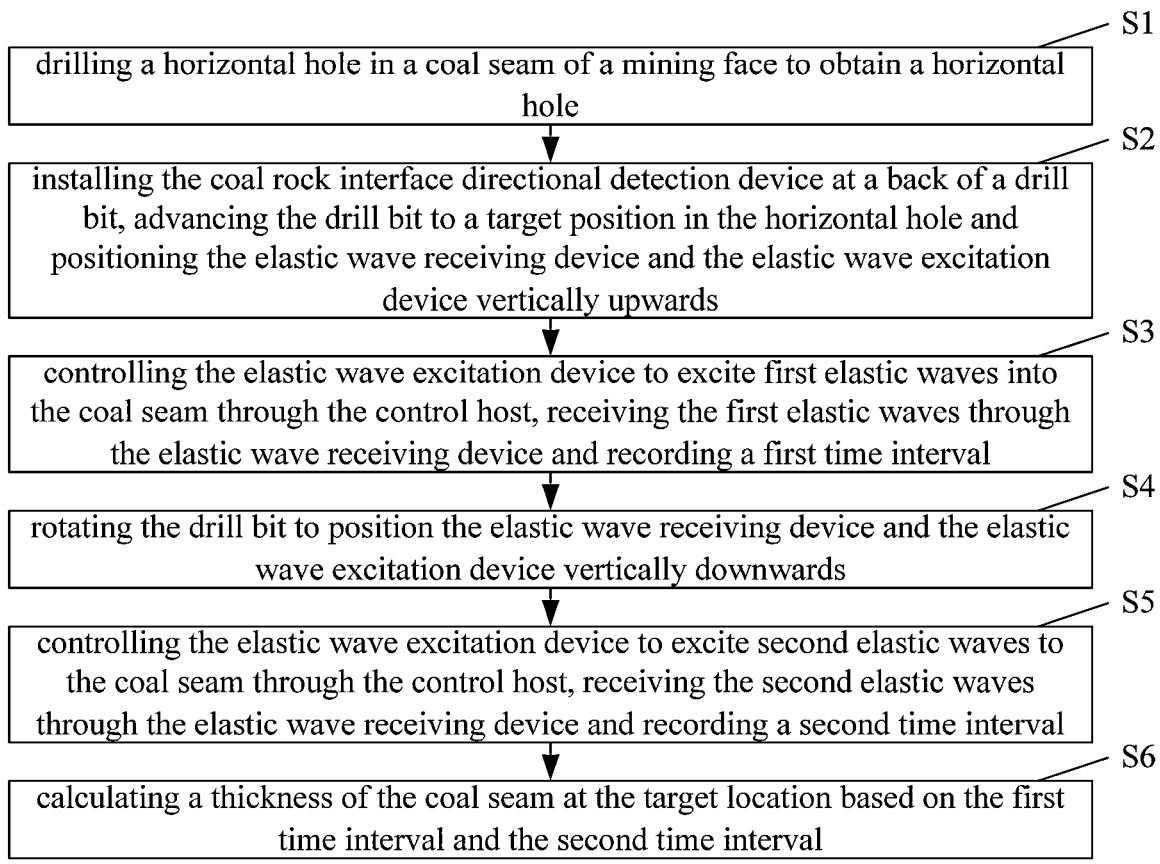
FIG. 5 is a schematic diagram illustrating a process of a coal rock interface directional detection method based on elastic waves according to an example of the present disclosure.

Based on a same inventive concept, the present application also provides a coal rock interface directional detection method based on elastic waves applied in the coal rock interface directional detection device based on elastic waves as described in any one example. As shown in FIG. 5, the coal rock interface directional detection method based on elastic waves may include the following steps.

In S1, drilling a horizontal hole 7 in a coal seam 6 of a mining face to obtain a horizontal hole. Where, an extension direction of the horizontal hole 6 is perpendicular to a mining direction of the mining face.

Figure 3:
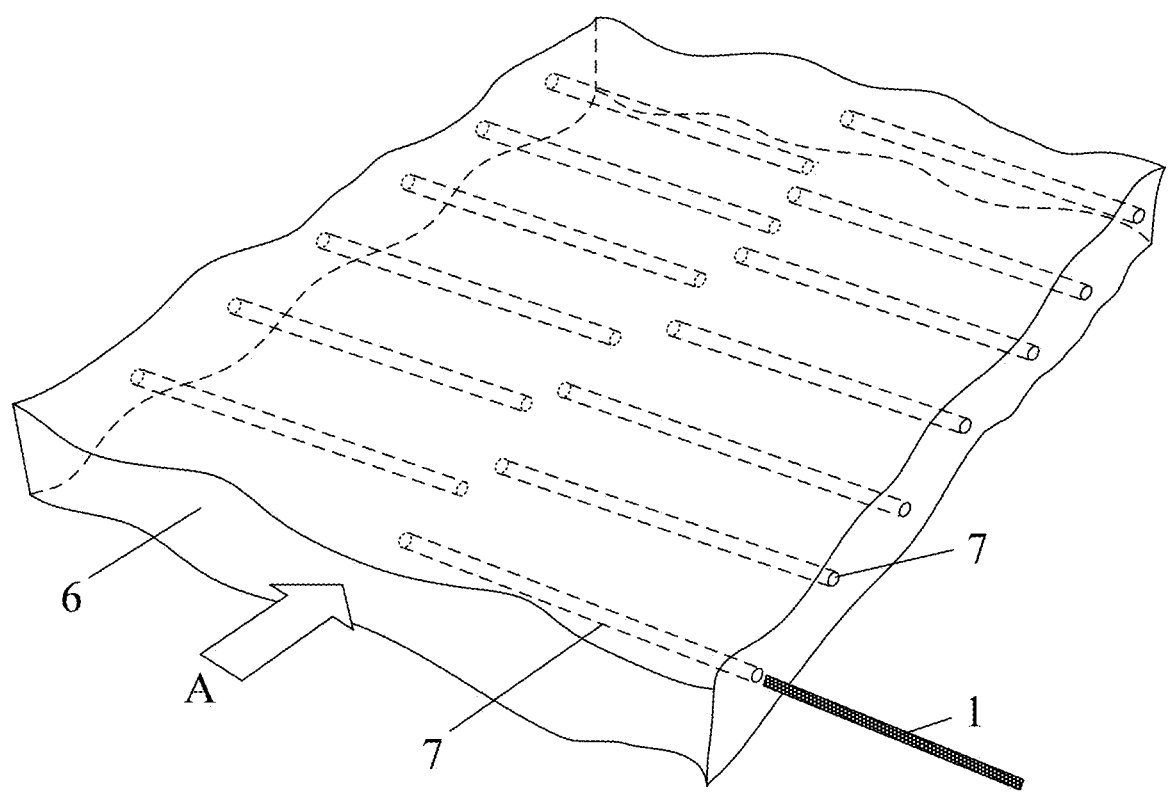
FIG. 3 is a schematic diagram of a structure of the coal seam of the mining face according to an example of the present disclosure.

As shown in FIG. 3, a direction A represents the mining direction of the mining face. The horizontal hole 7 is set in the coal seam 6, and the extension direction of the horizontal hole 7 is perpendicular to the mining direction, which facilitates the detection of information of the coal seam 6. Compared with setting a borehole parallel to the mining direction, the setting of the horizontal hole 7 has less interference and a better stability.

In S2, installing the coal rock interface directional detection device at a back of a drill bit, advancing the drill bit to a target position in the horizontal hole and positioning the elastic wave receiving device 1-1 and the elastic wave excitation device 1-2 vertically upwards.

In the above step S2, the protective cover 1-4 may be removed at first. Then the probe body 1 may be threaded connected to the drill bit. For example, the probe body 1 may be connected to a drill rod. Further, tests may be performed on the elastic wave receiving device 1-1 and the elastic wave excitation device 1-2. After the tests are passed, the sleeve 4 may be set outside the protective tube 2. Then, the probe body 1, sleeve 4, and protective tube 2 may be pushed to the target position with the drill bit. For example, the target position may be at the middle of the horizontal hole 7. Later, the elastic wave receiving device 1-1 and the elastic wave excitation device 1-2 may be set vertically upward to prepare for measuring the coal rock interface at the top of the horizontal hole 7. The control host 5 may be set outside the horizontal hole 7 and may be connected to the collection circuit board 3 inside the protective tube 2 via Bluetooth.

In S3, controlling the elastic wave excitation device 1-2 to excite first elastic waves into the coal seam 6 through the control host 5, receiving the first elastic waves through the elastic wave receiving device 1-1 and recording a first time interval.

In examples of the present disclosure, the elastic wave receiving device 1-1 and the elastic wave exciting device 1-2 are tightly attached to the top of the inner wall of the horizontal hole 7 to ensure the transmission effect of the elastic waves. The elastic wave exciting device 1-2 may be controlled by the control host 5 to excite elastic waves to the coal seam 6. The elastic waves may propagate in the coal seam 6 and reflect at boundaries between the coal seam 6 and rock layers. The elastic waves may be received by the elastic wave receiving device 1-1 and the first time interval between the transmitting time of the elastic waves and the receiving time of the elastic waves may be recorded.

Figure 4:
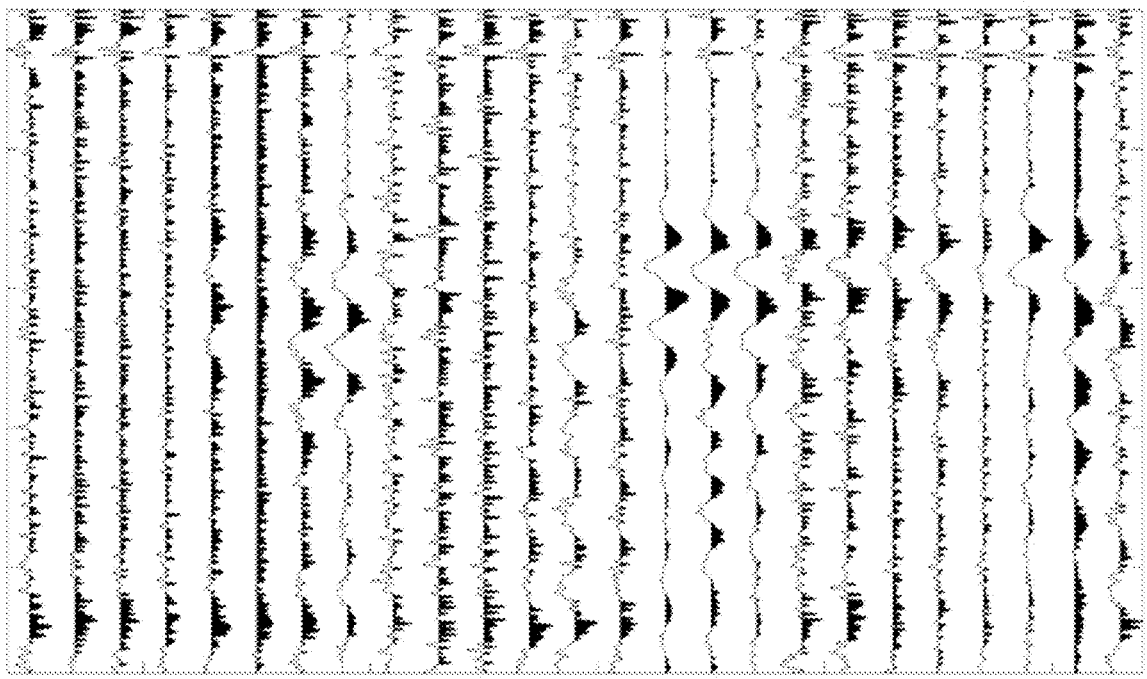
FIG. 4 is a schematic diagram of a waveform of the elastic wave received by the elastic wave receiving device according to an example of the present disclosure.

FIG. 4 shows a waveform diagram of an elastic waves received by the elastic wave receiving device 1-1. In FIG. 4, the y-axis in a vertical direction may refer to time, in a unit of us (microsecond). The range for the y-axis is from 0 to 240. In examples of the present disclosure, in order to reduce interferences of noises, the first time interval should be recorded when the received elastic wave exceeds a certain threshold.

In S4, rotating the drill bit to position the elastic wave receiving device 1-1 and the elastic wave excitation device 1-2 vertically downwards.

In examples of the present disclosure, after testing the coal rock interface at the top, the drill bit may be rotated by 180° to position the elastic wave receiving device 1-1 and the elastic wave excitation device 1-2 vertically downwards in preparation for testing the coal rock interface at the bottom.

In S5, controlling the elastic wave excitation device 1-2 to excite second elastic waves to the coal seam through the control host 5, receiving the second elastic waves through the elastic wave receiving device 1-1 and recording a second time interval.

Similar to the principle of step S3, the second time interval between the transmitting time of the elastic waves and the receiving time of the elastic waves may be recorded in the above step S5.

In S6, calculating a thickness of the coal seam at the target location based on the first time interval and the second time interval.

In examples of the present disclosure, the thickness of the coal seam 6 at the top of horizontal hole 7 can be calculated based on the first time interval to determine the coal rock interface at the top. Moreover, the thickness of the coal seam 6 at the bottom of horizontal hole 7 can be calculated based on the second time interval to determine the coal rock interface at the bottom. In this way, the overall thickness of coal seam 6 can be obtained.

It can be seen from the above processes, the propagation distance may be calculated using propagation characteristics of the elastic waves in a physically similar model. The distance calculation methods may include: an amplitude detection method, a phase detection method, and a transit time method. The transit time method has a higher accuracy, a good real-time performance, and may be less affected by environments. When the elastic waves propagate in a measured object, they will be reflected and refracted. The reflected elastic waves are the main basis for measuring a distance.

In examples of the present disclosure, formulas for calculating the thickness h of the coal seam 6 at the target location may include:

$$h = h_1 + h_2; t_1 = \frac{\sqrt{4h_1^2 + x^2}}{v}; t_2 = \frac{\sqrt{4h_2^2 + x^2}}{v};$$

$h_1$ represents a thickness from the horizontal hole to a top coal rock interface of the coal seam at the target position; $h_2$ represents a thickness from the horizontal hole to a bottom coal rock interface of the coal seam at the target position; $t_1$ represents the first time interval; $t_2$ represents the second time interval; x represents a horizontal distance between the elastic wave receiving device 1-1 and the elastic wave excitation device 1-2; and v represents a propagation speed of the elastic wave in the coal seam 6, with a unit of m/s. The propagation speed can be calculated based on a known thickness of a coal seam 6 and a time interval between a transmitting time and a receiving time of an elastic wave.

To be noted, the first time interval and the second time interval are both round-trip times of elastic waves. The above formula takes into account the offset effects of the elastic wave receiving device 1-1 and the elastic wave excitation device 1-2, as well as a reflection angle of the elastic waves. Therefore, the thickness of the coal seam 6 calculated may be more accurate.

In some examples of the present disclosure, the coal rock interface directional detection method based on elastic waves may further include the following step.

In S7, advancing the drill bit in the horizontal hole 7 gradually to obtain the thickness of the coal seam 6 at multiple target positions, and obtaining a thickness distribution state of the coal seam 6 along the extension direction of the horizontal hole 7.

In examples of the present disclosure, the drill bit may be advanced gradually in the horizontal hole 7, that is, the coal seam 6 may be scanned point by point. By repeating the steps S2-S6, the thickness of the coal seam 6 at each point can be obtained. Then, through a curve fitting and other means, the thickness distribution of the coal seam 6 along the horizontal hole 7 can be obtained.

In examples of the present disclosure, as shown in FIG. 3, the number of horizontal holes 7 may be multiple, and adjacent horizontal holes 7 may be spaced apart.

By conducting directional detections of coal rock interfaces in multiple horizontal holes 7, an overall thickness distribution of the coal seam 6 can be obtained.

It should be noted that the method of the present disclosure can be executed by a single device, such as a computer or server. The method of the present disclosure can also be applied in distributed scenarios, where multiple devices cooperate with each other to complete a task. In this distributed scenario, one device among these multiple devices can only perform one or more steps of the method described in any of the examples of the present disclosure, and these multiple devices will interact with each other to complete the method.

It should be noted that specific examples of the present disclosure have been described above. Other examples are within the scope of the appended claims. In some cases, the actions or steps described may be performed in a different order than in the examples described above and still achieve the desired results. In addition, the process depicted in the drawing does not necessarily require a specific or continuous order to achieve the desired results. In some implementations, multitasking and parallel processing are also possible or may be advantageous.

Based on a same inventive concept of the coal and coalbed methane mining method based on a semantic source described in any of the above examples, the present disclosure also provides a computer program, which includes computer instructions. In some examples, the computer instructions may be executed by one or more processors of a computer to enable the computer and/or processor to execute the coal and coalbed methane mining method based on a semantic source. Corresponding to the execution subject of each step in examples of the coal and coalbed methane mining method based on a semantic source, the processor executing the corresponding step can belong to the corresponding execution subject.

The computer program of the above example is used to enable the computer and/or processor to execute a coal and coalbed methane mining method based on a semantic source as described in any one of the above examples, and has the beneficial effects of corresponding methods, which will not be repeated here.

Those of ordinary skill in the art should appreciate that the discussion on any one of the foregoing examples is merely exemplary, but is not intended to imply that the scope of the present disclosure (including the claims) is limited to these examples. Under the idea of the present disclosure, the technical features of the foregoing examples or different examples may be combined, the steps may be implemented in any order, and there are many other variations in different aspects of the examples of the present disclosure, all of which are not provided in detail for simplicity.

Besides, for the sake of simplifying description and discussion and not making the examples of the present disclosure difficult to understand, the provided drawings may show or not show the public power supply/earthing connection to an integrated circuit (IC) chip and other parts. Besides, the device may be shown in block diagram form to prevent the examples of the present disclosure from being difficult, and moreover, this considers the following facts, that is, the details of the implementations with regard to the devices in these block diagrams highly depend on the platform which will implement the examples of the present disclosure (that is, these details should be completely within the scope understood by those skilled in the art). Where specific details (e.g. circuits) are set forth in order to describe exemplary examples of the present disclosure, it should be apparent to those skilled in the art that the examples of the present disclosure can be practiced without, or with variation of, these specific details. Therefore, these descriptions shall be considered to be illustrative instead of restrictive thereto. Therefore, these descriptions shall be considered to be illustrative instead of restrictive thereto.

While the present disclosure has been described in conjunction with specific examples thereof, many alternatives, modifications and variations of such examples will be apparent to those of ordinary skill in the art in light of the foregoing description. For example, other memory architectures, such as dynamic RAM (DRAM), may use the examples discussed.

The examples of the disclosure are intended to embrace all such alternatives, modifications, and variations as to fall within the broad scope of the appended claims. Therefore, any omission, modification, equivalent replacement and improvement made within the spirits and principles of the examples of the present disclosure shall fall within the protection scope of the present disclosure.

What is claimed is:

1. A coal rock interface directional detection device based on elastic waves, comprising:
    a probe body; wherein the probe body comprises an elastic wave receiving device and an elastic wave excitation device set at an interval at the top; one side of the probe body is provided with an adapter; a cross-sectional size of the adapter is smaller than a cross-sectional size of the probe body;
    a protective tube with one end connected to the adapter; wherein, the protective tube comprises a collection circuit board inside the protective tube; the collection circuit board has an electric connection with the elastic wave receiving device and the elastic wave excitation device;
    a sleeve, installed outside the protective tube, with one end connected to the side of the probe body near the adapter and with the other end connected to a side of the protective tube away from the adapter; and
    a control host, having a wireless connection with the collection circuit board; wherein
    the protective tube comprises: a first tube and a second tube which are connected; a diameter of the first tube is smaller than a diameter of the second tube; one end of the first tube has a threaded connection with the adapter; one end of the second tube has a threaded connection with the sleeve; and the collection circuit board is arranged inside the second tube;
    the first tube is equipped with a sliding nut, which has a threaded connection with the end of the first tube to cover the adapter;
    the probe body has a threaded connection with a protective cover at one end away from the adapter;
    the elastic wave excitation device is located near the adapter; and
    the collection circuit board is equipped with a processing module, an elastic wave excitation circuit, an elastic wave reception circuit, a wireless communication module, a power supply module, and a storage module; the elastic wave excitation circuit, the elastic wave reception circuit, the wireless communication module, the power supply module, and the storage module have an electric connection with the processing module; the elastic wave excitation circuit has an electric connection with the elastic wave excitation device; the elastic wave reception circuit has an electric connection with the elastic wave reception device; and the wireless communication module is in communication with the control host.

2. A coal rock interface directional detection method based on elastic waves, applied in a coal rock interface directional detection device based on elastic waves wherein, the coal rock interface directional detection device comprises:
    a probe body; wherein the probe body comprises an elastic wave receiving device and an elastic wave excitation device set at an interval at the top; one side of the probe body is provided with an adapter; a cross-sectional size of the adapter is smaller than a cross-sectional size of the probe body;
    a protective tube with one end connected to the adapter; wherein, the protective tube comprises a collection circuit board inside the protective tube; the collection circuit board has an electric connection with the elastic wave receiving device and the elastic wave excitation device;
    a sleeve, installed outside the protective tube, with one end connected to the side of the probe body near the adapter and with the other end connected to a side of the protective tube away from the adapter; and
    a control host, having a wireless connection with the collection circuit board; wherein
    the protective tube comprises: a first tube and a second tube which are connected; a diameter of the first tube is smaller than a diameter of the second tube; one end of the first tube has a threaded connection with the adapter; one end of the second tube has a threaded connection with the sleeve; and the collection circuit board is arranged inside the second tube;
    the first tube is equipped with a sliding nut, which has a threaded connection with the end of the first tube to cover the adapter;
    the probe body has a threaded connection with a protective cover at one end away from the adapter;
    the elastic wave excitation device is located near the adapter; and
    the collection circuit board is equipped with a processing module, an elastic wave excitation circuit, an elastic wave reception circuit, a wireless communication module, a power supply module, and a storage module; the elastic wave excitation circuit, the elastic wave reception circuit, the wireless communication module, the power supply module, and the storage module have an electric connection with the processing module; the elastic wave excitation circuit has an electric connection with the elastic wave excitation device; the elastic wave reception circuit has an electric connection with the elastic wave reception device; and the wireless communication module is in communication with the control host; and
    the coal rock interface directional detection method based on elastic waves comprises:
    drilling a horizontal hole in a coal seam of a mining face to obtain a horizontal hole; wherein, an extension direction of the horizontal hole is perpendicular to a mining direction of the mining face;
    installing the coal rock interface directional detection device at a back of a drill bit;
    advancing the drill bit to a target position in the horizontal hole;
    positioning the elastic wave receiving device and the elastic wave excitation device vertically upwards;
    controlling the elastic wave excitation device to excite first elastic waves into the coal seam through the control host;
    receiving the first elastic waves through the elastic wave receiving device;
    recording a first time interval;
    rotating the drill bit to position the elastic wave receiving device and the elastic wave excitation device vertically downwards;
    controlling the elastic wave excitation device to excite second elastic waves into the coal seam through the control host;

receiving the second elastic waves through the elastic wave receiving device;

recording a second time interval; and calculating a thickness of the coal seam at the target location based on the first time interval and the second time interval.

3. The coal rock interface directional detection method based on elastic waves according to claim 2, wherein, formulas for calculating the thickness h of the coal seam at the target location comprise:

$$h = h_1 + h_2; t_1 = \frac{\sqrt{4h_1^2 + x^2}}{v}; t_2 = \frac{\sqrt{4h_2^2 + x^2}}{v};$$

wherein, $h_1$ represents a thickness from the horizontal hole to a top coal rock interface of the coal seam at the target position; $h_2$ represents a thickness from the horizontal hole to a bottom coal rock interface of the coal seam at the target position; $t_1$ represents the first time interval; $t_2$ represents the second time interval; x represents a horizontal distance between the elastic wave receiving device and the elastic wave excitation device; and v represents a propagation speed of the elastic wave in the coal seam.

4. The coal rock interface directional detection method based on elastic waves according to claim 2, further comprising:

advancing the drill bit in the horizontal hole gradually to obtain the thickness of the coal seam at multiple target positions; and obtaining a thickness distribution state of the coal seam along the extension direction of the horizontal hole.

5. The coal rock interface directional detection method based on elastic waves according to claim 2, wherein, the number of horizontal holes is multiple, and adjacent horizontal holes are spaced apart.

\* \* \* \* \*